(12) United States Patent
Hao et al.

(10) Patent No.: US 8,416,718 B2
(45) Date of Patent: Apr. 9, 2013

(54) TRANSMITTING METHODS OF A SIGNAL ON A RANDOM ACCESS CHANNEL IN A WIRELESS COMMUNICATION SYSTEM

(75) Inventors: Peng Hao, Shenzhen (CN); Shuqiang Xia, Shenzhen (CN); Chunli Liang, Shenzhen (CN); Bo Dai, Shenzhen (CN); Bin Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 12/808,309

(22) PCT Filed: Jan. 16, 2009

(86) PCT No.: PCT/CN2009/070185
§ 371 (c)(1),
(2), (4) Date: Jun. 15, 2010

(87) PCT Pub. No.: WO2009/092329
PCT Pub. Date: Jul. 30, 2009

(65) Prior Publication Data
US 2010/0260080 A1    Oct. 14, 2010

(30) Foreign Application Priority Data

Jan. 17, 2008    (CN) .......................... 2008 1 0003737

(51) Int. Cl.
*H04J 3/00*    (2006.01)
(52) U.S. Cl.
USPC ........................................................ 370/280
(58) Field of Classification Search .................. 370/203,
370/204–271, 310–350, 351–394, 395.1,
370/395.3, 395.4, 395.41, 395.42, 395.5,
370/395.52, 395.53, 412–421, 431–497,
370/498–522, 523–520, 521–529
See application file for complete search history.

(56) References Cited

U.S. PATENT DOCUMENTS 8,107,445 B2 *    1/2012 Lee et al. ....................... 370/336

2007/0171889 A1    7/2007 Kwon et al.
(Continued)

FOREIGN PATENT DOCUMENTS

| CN | 1855767 A | 11/2006 |
| CN | 101043256 A | 9/2007 |

(Continued)

OTHER PUBLICATIONS

International Search Report in international application No. PCT/CN2009/070185, mailed on Apr. 23, 2009.
English Translation of the Written Opinion of the International Search Authority in international application No. PCT/CN2009/070185, mailed on Apr. 23, 2009.

(Continued)

*Primary Examiner* — Kwang B. Yao
*Assistant Examiner* — Jung-Jen Liu
(74) *Attorney, Agent, or Firm* — Fredrikson & Byron, P.A.

(57) ABSTRACT

A transmitting method of a signal on a random access channel in a wireless communication system, comprises the steps that: a terminal transmits a preamble on the random access channel with a set time length ahead of the end position of an uplink pilot time slot, and the length of the preamble is the length of two symbols without a cyclic prefix. Another transmitting method of a signal on a random access channel in a wireless communication system, comprises the steps that: a terminal transmits a cyclic prefix and a preamble on the random access channel with a set time length ahead of the end position of an uplink pilot time slot, and the length of the preamble is the length of two symbols without a cyclic prefix. The methods can avoid the interference of the preamble to the data of the uplink subframe, and can improve the coverage area of the random access channel and the work efficiency of the time division duplex system.

7 Claims, 2 Drawing Sheets

U.S. PATENT DOCUMENTS

| | | | | |
|---|---|---|---|---|
| 2008/0080461 A1* | 4/2008 | Lee | ................................ | 370/342 |
| 2009/0067540 A1* | 3/2009 | Lee et al. | ........................ | 375/296 |
| 2009/0109919 A1* | 4/2009 | Bertrand et al. | ............... | 370/330 |

FOREIGN PATENT DOCUMENTS

| | | | |
|---|---|---|---|
| CN | 101217808 | A | 7/2008 |
| EP | 1811691 | A2 | 7/2007 |
| EP | 2207278 | A1 | 7/2010 |
| JP | 2011501920 | A | 1/2011 |
| WO | 2007082458 | A1 | 7/2007 |

OTHER PUBLICATIONS

CMCC, Catt, et al. (Jeji, Korea) "Way Forward on LTE TDD Frame Structure," Nov. 5-9, 2007, 2 pgs.

Catt, (Athens, Greece) "Random Access Preamble Structure for LTE TDD Frame Structure Type 2," Aug. 20-24, 2007, 4 pgs.

Gao, Y. et al., "An Analysis is and implementation of the Control of Random Access Transmission Protocol in WCDMA." Journal of Military Communications Technology, vol. 22, No. 2, Jun. 2001, 6 pgs.

* cited by examiner

TRANSMITTING METHODS OF A SIGNAL ON A RANDOM ACCESS CHANNEL IN A WIRELESS COMMUNICATION SYSTEM

RELATED APPLICATIONS

This application is a 35 U.S.C. 371 national stage filing from International Application No. PCT/CN2009/070185 filed Jan. 16, 2009 and to Chinese Patent Application No. 200810003737.3 filed Jan. 17, 2008, the teachings of which are incorporated herein by reference.

TECHNICAL FIELD

The present invention relates to the filed of mobile communications, and particularly to transmitting methods of a signal on a random access channel in a wireless communication system.

BACKGROUND

FIG. 1 shows a frame structure of a TDD (Time Division Duplex) mode in an LTE (Long Term Evolution) system. In this frame structure, one radio frame of 10 ms is divided into two half-frames. Every half-frame is divided into 10 time slots (number from 0 to 9) with a length of 0.5 ms respectively, and two time slots constitute one subframe with a length of 1 ms. One half-frame consists of 5 subframes (number from 0 to 4). For short cyclic prefixes which are 5.21 us and 4.69 us in length, one time slot consists of 7 symbols with a length of 66.7 us, wherein the cyclic prefix (CP) of the first symbol is 5.21 us in length, the cyclic prefixes of the other 6 symbols are 4.69 us in length; for a long CP which is 16.67 us in length, one time slot consists of 6 symbols. In this frame structure, the configuration characteristics of the subframe are shown as follows:

(1) subframe 0 is fixedly used for a downlink;

(2) subframe 1 (called special subframe thereinafter) consists of 3 special time slots: a DwPTS (Downlink Pilot Time Slot), a GP (Guard Period) and a UpPTS (Uplink Pilot Time Slot) respectively, wherein:

1) the DwPTS is used for the downlink, and at least one symbol is used for transmitting a P-SCH (Primary Synchronization Channel); when the DwPTS consists of a plurality of symbols, the P-SCH is placed in the first symbol (as shown in FIG. 1);

2) the GP is guard time, without transmitting any data; and 3) the UpPTS is used for an uplink, and it may be used for transmitting signals such as an RACH (Random Access Channel), data, sounding pilot etc; and (3) the former n subframe(s) after subframe 1 may be used for uplink transmitting ($1 \leq n \leq 3$), and the latter 3−n subframe(s) may be used for downlink transmitting.

As shown in FIG. 2, the RACH channel consists of the CP and a preamble, which are Tcp and Tpre in length respectively. The CP may be 0. Moreover, the distance between the end position of the preamble and the end position of the UpPTS is Tgt (as shown in FIG. 1). In certain standards, the CP and the preamble are generally called preamble. The CP is still called cyclic prefix, and the preamble shown in FIG. 2 is called sequence. The names of the RACH channel structure and its components in the present invention are according to FIG. 2.

With respect on how to transmit a signal on the RACH in the UpPTS, the corresponding solutions of the structure and transmitting method have not yet been proposed until now.

SUMMARY

The technique problem that the present invention aims to resolve is that transmitting methods of a signal on a random access channel in a wireless communication system need to be provided.

When a terminal transmits the signal on the random access channel, a preamble can not interfere with the data of the later uplink subframe. It is easy to understand that the more forward that the start position of the RACH is, the bigger the Tgt will be, and the larger the transmitting time delay of the signal on the random access channel that the system permit will be, so the coverage area of the random access channel can be improved effectively. But if the position of the RACH is too forward, the previous downlink signal will be interfered. Moreover, if a CP is added in front of the preamble, the signal and the multi-path of UE (User Equipment) on a border of a cell should be fall within a search window of a receiver.

In order to resolve the above-mentioned technique problem, the present invention provides a transmitting method of a signal on a random access channel in a wireless communication system, wherein, a terminal transmits a preamble on the random access channel with a set time length ahead of the end position of an uplink pilot time slot, and the length of the preamble is the length of two symbols without a cyclic prefix.

Further, the above-mentioned transmitting method can also have the following characteristics:

the length of said one symbol without the cyclic prefix may be a half of the length of the preamble Tpre, i.e. Tpre/2, wherein Tpre=4096×Ts, and wherein Ts=1/30.72 us.

Further, the above-mentioned transmitting method can also have the following characteristics:

the preamble may be transmitted at a position n×Ts ahead of the end position of the uplink pilot time slot, wherein n×Ts may be the length of the uplink pilot time slot; or the preamble may be transmitted at a position m×Ts ahead of the end position of the uplink pilot time slot, wherein m×Ts may be the sum of the lengths of the symbols with the cyclic prefix in the uplink pilot time slot occupied by the random access channel.

Further, the above-mentioned transmitting method can also have the following characteristics:

the preamble may be transmitted at a position 4400×Ts ahead of the end position of the uplink pilot time slot, and the length of the uplink pilot time slot may be 4400×Ts; or the preamble may be transmitted at a position 4384×Ts ahead of the end position of the uplink pilot time slot, and the length of the uplink pilot time slot may be 4384×Ts; or the preamble may be transmitted at a position 4416×Ts ahead of the end position of the uplink pilot time slot, and the length of the uplink pilot time slot may be 4416×Ts.

Further, the above-mentioned transmitting method can also have the following characteristics:

the wireless communication system may be long term evolution system with time division duplex mode, and the symbols may be orthogonal frequency division multiplexing symbols.

In order to resolve the above-mentioned technique problem, the present invention also provides a transmitting method of a signal on a random access channel in a wireless communication system, wherein, a terminal transmits a cyclic prefix and a preamble on the random access channel with a set time length ahead of the end position of an uplink pilot time slot in order, and the length of the preamble is the length of two symbols without a cyclic prefix.

Further, the above-mentioned transmitting method can also have the following characteristics:

the length of said one symbol without the cyclic prefix may be a half of the length of the preamble Tpre, i.e. Tpre/2, wherein Tpre=4096×Ts, and wherein Ts=1/30.72 us.

Further, the above-mentioned transmitting method can also have the following characteristics:

the set time length may be n×Ts+Tcp, wherein n×Ts may be the length of the uplink pilot time slot, Tcp may be the length of the cyclic prefix, and Ts=1/30.72 us.

Further, the above-mentioned transmitting method can also have the following characteristics:

the length of the cyclic prefix may be Tcp=m×Ts−Tpre+Tds, wherein m×Ts may be the length of the symbol with the cyclic prefix in the uplink pilot time slot occupied by the random access channel, Tds may be the length of the largest delay extension on a multi-path channel transmitted in order under the cyclic prefix and the preamble application environment in the uplink pilot time slot, its unit may be us, Tpre=4096×Ts, and Ts=1/30.72 us.

Further, the above-mentioned transmitting method can also have the following characteristics:

the set time length may be m×Ts, wherein m×Ts may be the sum of the lengths of the symbols with the cyclic prefix in the uplink pilot time slot occupied by the random access channel, Tcp may be the length of the cyclic prefix, and Ts=1/30.72 us.

Further, the above-mentioned transmitting method can also have the following characteristics:

the length of the cyclic prefix may be Tcp=(m×Ts−Tpre)/2+Tds/2, wherein m×Ts may be the length of the symbol with the cyclic prefix in the uplink pilot time slot occupied by the random access channel, Tds may be the length of the largest delay extension on a multi-path channel transmitted in order under the cyclic prefix and the preamble application environment in the uplink pilot time slot, its unit may be us, Tpre=4096×Ts, and Ts=1/30.72 us.

Further, the above-mentioned transmitting method can also have the following characteristics: the random access channel may be transmitted in one of the following manners:

the length of the uplink pilot time slot may be equal to 4400×Ts, Tcp=304×Ts, and the set time length may be 4704×Ts; or the length of the uplink pilot time slot may be equal to 4384×Ts, Tcp=288×Ts, and the set time length may be 4672×Ts; or the length of the uplink pilot time slot may be equal to 4416×Ts, Tcp=320×Ts, and the set time length may be 4736×Ts; or the length of the uplink pilot time slot may be equal to 4400×Ts, Tcp=464×Ts, and the set time length may be 4864×Ts; or the length of the uplink pilot time slot may be equal to 4384×Ts, Tcp=448×Ts, and the set time length may be 4832×Ts; or the length of the uplink pilot time slot may be equal to 4416×Ts, Tcp=480×Ts, and the set time length may be 4896×Ts; or the length of the uplink pilot time slot may be equal to 4400×Ts, Tcp=448×Ts, and the set time length may be 4848×Ts; or the length of the uplink pilot time slot may be equal to 4384×Ts, Tcp=432×Ts, and the set time length may be 4816×Ts; or the length of the uplink pilot time slot may be equal to 4416×Ts, Tcp=464×Ts, and the set time length may be 4880×Ts.

Further, the above-mentioned transmitting method can also have the following characteristics:

the wireless communication system may be long term evolution system with time division duplex mode, and the symbols may be orthogonal frequency division multiplexing symbols.

The present invention provides corresponding transmitting methods of a signal on random access channel according to the designed RACH channel structure, and it helps to avoid the interference occurred by the preamble to the data of the later uplink subframe, so the coverage area of the random access channel can be improved effectively, and the work efficiency of TDD system can be improved. Further, the success rate of the random access can be ensured under multipath environment by way of the CP design of certain embodiments.

DETAILED DESCRIPTION

The embodiments of the present invention will be illustrated in detail by combining the drawings and embodiments as follows. Thus the implementation procedure on how to resolve the technical problem by using technical means and achieve technical effect in the present invention can be understood perfectly and implemented.

The present invention provides two kinds of RACH channel structures and corresponding signals transmitting methods depending on whether a CP is added in front of a preamble, and it is described as follows respectively.

The First Embodiment

Figure 1:
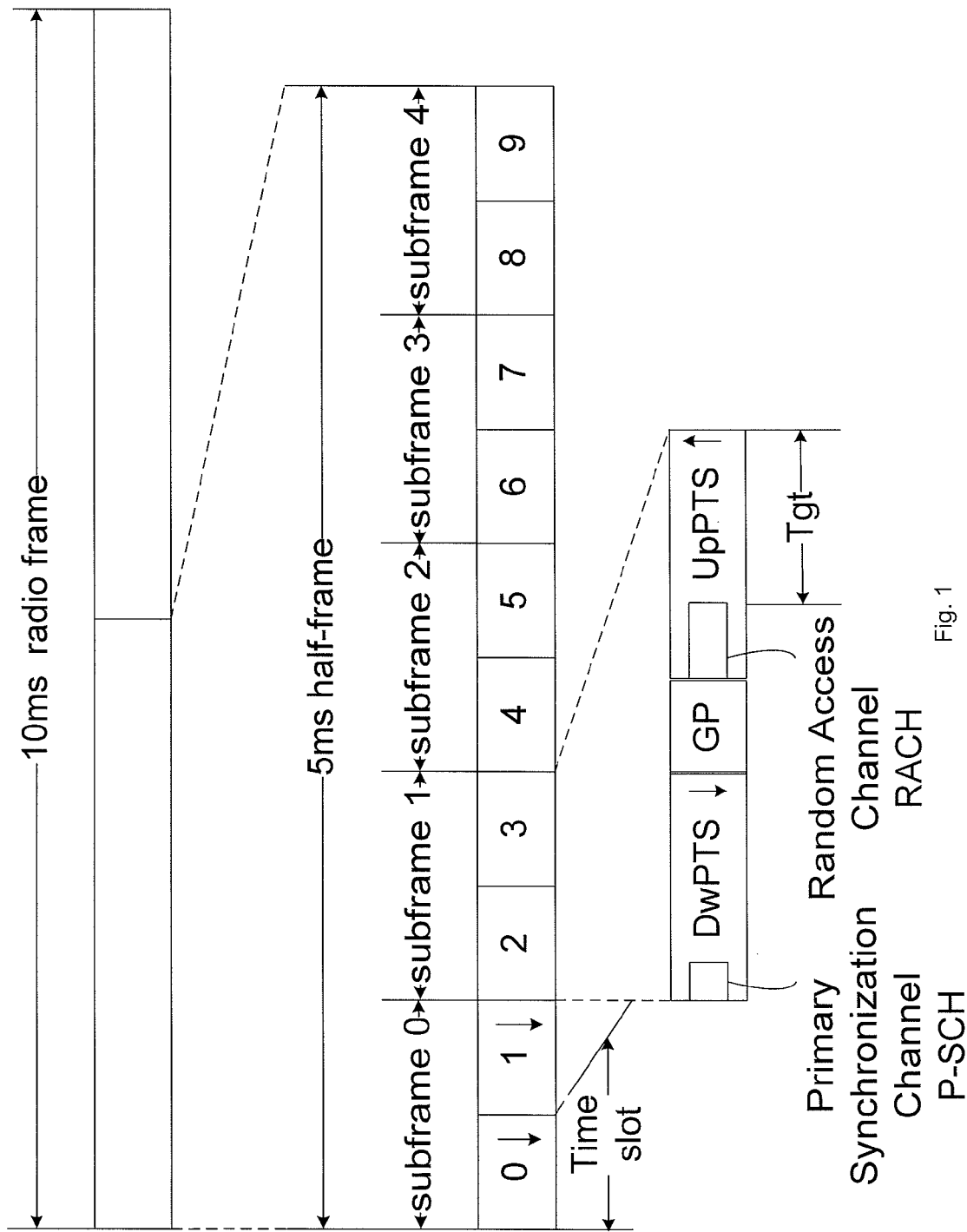
FIG. 1 is a frame structure of a TDD mode in an LTE system.
Figure 2:
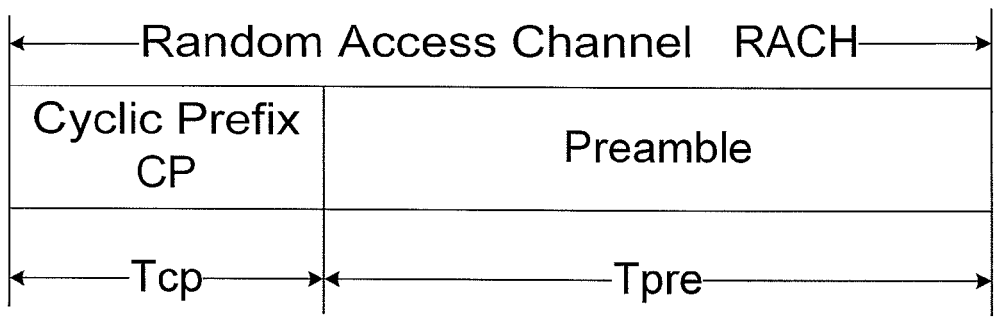
FIG. 2 is a schematic diagram illustrating an RACH channel structure.
Figure 3:
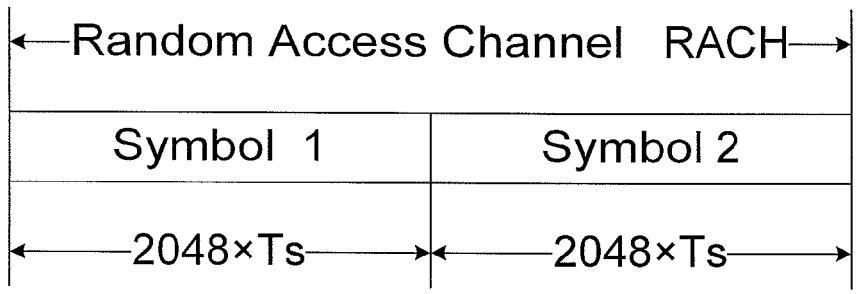
FIG. 3 is a schematic diagram illustrating the first RACH channel structure according to the present invention.

As shown in FIG. 3, the CP is not added in front of the preamble in the RACH channel structure of this embodiment, i.e. Tcp=0×Ts, and the length of the preamble is the length of two OFDM (Orthogonal Frequency Division Multiplexing) symbols without the CP. The length of each OFDM symbol is Tpre/2=133.34 us, i.e. Tpre=4096×Ts, wherein Ts=1/30.72 us, which is the time unit defined by TDD mode in LTE system.

The transmitting moment of a signal on the RACH can be determined by the following two manners:

A, a terminal can transmit the preamble at a position n×Ts ahead of the end position of UpPTS, wherein n×Ts is the length of the UpPTS, and the n is the number of Ts contained in the length of the UpPTS; and B, the terminal can transmit the preamble at a position m×Ts ahead of the end position of the UpPTS, wherein m×Ts is the sum of the lengths of the symbols (with the CP) occupied by the RACH in the UpPTS. The length is determined according to the amount and type of the occupied OFDM symbol in the UpPTS. The symbol of long CP is (512+2048)Ts=2560Ts, the first type of short CP symbol is (144+2048)Ts=2192Ts, and the second type of short CP symbol is (160+2048)Ts=2208Ts.

Several examples of specific applications are given below.

Example 1

The CP is not added in front of the preamble, i.e. Tcp=0×Ts. The length of the preamble is the length of two OFDM symbols without the CP, i.e. Tpre=4096×Ts, wherein Ts=1/30.72 us.

When the length of the UpPTS is 4400×Ts, the signal (i.e. the preamble) on the RACH is transmitted at a position 4400×Ts ahead of the end position of the UpPTS.

Example 2

The CP is not added in front of the preamble, i.e. Tcp=0×Ts. The length of the preamble is the length of two OFDM symbols without the CP, i.e. Tpre=4096×Ts, wherein Ts=1/30.72 us.

When the length of the UpPTS is 4384×Ts, the signal on the RACH is transmitted at a position 4384×Ts ahead of the end position of the UpPTS.

Example 3

The CP is not added in front of the preamble, i.e. Tcp=0×Ts. The length of the preamble is the length of two OFDM symbols without the CP, i.e. Tpre=4096×Ts, wherein Ts=1/30.72 us.

When the length of the UpPTS is 4416×Ts, the signal on the RACH is transmitted at a position 4416×Ts ahead of the end position of the UpPTS.

In the above several examples, the sum of the lengths of the symbols with the cyclic prefix occupied by the RACH channel in the UpPTS is equal to the length of the UpPTS time slot, i.e. m=n=2. The result is consistent according to the manner A and the manner B. If the n is greater than the m, then the start position of the RACH channel that obtained according to the manner A will be more forward than the position obtained according to the manner B.

The Second Embodiment

Figure 4:
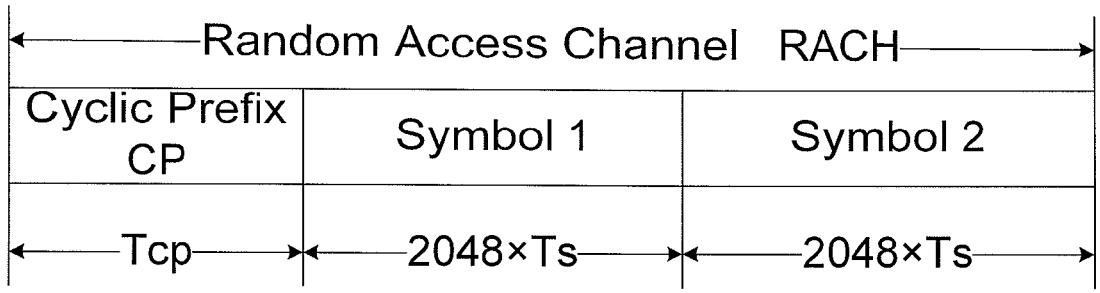
FIG. 4 is a schematic diagram illustrating the second RACH channel structure according to the present invention.

As shown in FIG. 4, the CP is added in front of the preamble in the RACH channel structure of this embodiment. At this moment, the length of the preamble is still the length of two OFDM symbols without the CP, i.e. Tpre=4096×Ts, wherein Ts=1/30.72 us.

The length of the CP can be determined by the following two manners.

A, the length of the added CP is Tcp=m×Ts−Tpre+Tds, wherein m×Ts is the sum of lengths of the symbols with the cyclic prefix occupied by the RACH in the UpPTS, Tds is the length of the largest delay extension on a multi-path channel transmitted under the RACH application environment in the UpPTS, and its unit is us.

This moment, the signal on the RACH can be transmitted at a position n×Ts+Tcp ahead of the end position of the UpPTS, wherein n×Ts is the length of the UpPTS. Certainly, when Tcp is other values, the CP and the preamble can also be transmitted at a position n×Ts+Tcp ahead of the end position of the UpPTS in order.

B, the length of the added CP is Tcp=(m×Ts−Tpre)/2+Tds/2, the meanings of all symbols are the same as the above ones.

This moment, the CP and the preamble can be transmitted at a position m×Ts ahead of the end position of the UpPTS in order, wherein m×Ts is the sum of the lengths of the symbols (with the CP) occupied by the RACH channel in the UpPTS. Similarly, when Tcp is other values, the CP and the preamble can also be transmitted at a position m×Ts ahead of the end position of the UpPTS in order.

Several examples of specific applications are given below.

Example 4

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4400×Ts, suppose that Tds=0, then Tcp=304×Ts, the signal on the RACH is transmitted at a position 4704×Ts ahead of the end position of the UpPTS.

Example 5

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4384×Ts, suppose that Tds=0, then Tcp=288×Ts, the signal on the RACH is transmitted at a position 4672×Ts ahead of the end position of the UpPTS.

Example 6

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4416×Ts, suppose that Tds=0, then Tcp=320×Ts, the signal on the RACH is transmitted at a position 4736×Ts ahead of the end position of the UpPTS.

Example 7

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4400×Ts, suppose that Tds=160, then Tcp=464×Ts, the signal on the RACH is transmitted at a position 4864×Ts ahead of the end position of the UpPTS.

Example 8

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4384×Ts, suppose that Tds=160, then Tcp=448×Ts, the signal on the RACH is transmitted at a position 4832×Ts ahead of the end position of the UpPTS.

Example 9

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4416×Ts, suppose that Tds=160, then Tcp=480×Ts, the signal on the RACH is transmitted at a position 4896×Ts ahead of the end position of the UpPTS.

Example 10

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4400×Ts, suppose that Tds=144, then Tcp=448× Ts, the signal on the RACH is transmitted at a position 4848× Ts ahead of the end position of the UpPTS.

Example 11

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4384×Ts, suppose that Tds=144, then Tcp=432× Ts, the signal on the RACH is transmitted at a position 4816× Ts ahead of the end position of the UpPTS.

Example 12

The CP is added in front of the preamble. This moment, the length of the preamble is the length of two OFDM symbols without the CP, i.e. Tpre=4096×Ts, wherein Ts=1/30.72 us.

When the length of symbols (with the CP) occupied by the RACH in the UpPTS is equal to the length of the UpPTS, and is equal to 4416×Ts, suppose that Tds=144, then Tcp=464× Ts, the signal on the RACH is transmitted at a position 4880× Ts ahead of the end position of the UpPTS.

It can be seen from the above schemes, that signals on the RACH in the present invention are transmitted at the position of the length with the CP symbol, which has integer number ahead of the start position of the UpPTS or the end position of the UpPTS. When the RACH contain the CP, the CP is transmitted at the above-mentioned transmitting position so as to make the distance i.e. Tgt between the end position of the preamble and the end position of the UpPTS as far as possible, and the coverage area of the random access channel can be improved effectively, so the work efficiency of TDD system can be improved. Meanwhile, the interference occurred with the downlink signal also can be avoided. Further, the success rate of the random access also can be ensured under the multi-path environments by way of considering the largest delay extension length of multi-path channels in the RACH application environments that transmitting in the UpPTS in the design of the CP.

The above-mentioned is only the embodiments of the present invention, which is not to limit the present invention. As for those skilled in the art, the present invention may have various modifications and alterations. Any modifications, equivalents and Improvements, etc. in the spirit and principle of the present invention should be contained in the scope of the claims of the present invention. For example, the system used in the present invention is not limited to the LTE system, and the symbols in the system frame of the system are not limited to the adoption of OFDM symbols.

INDUSTRIAL APPLICABILITY

The transmitting methods of a signal on the random access channel according to the present invention can be used for the LTE system to improve the coverage area of the random access channel effectively and the work efficiency of the TDD system, and it can also ensure the success rate of the random access under the multi-path environment.

What is claimed is:

1. A transmitting method of a signal on a random access channel in a wireless communication system, a terminal transmitting a cyclic prefix and a preamble on the random access channel with a set time length ahead of the end position of an uplink pilot time slot in order, and the length of the preamble being the length of two symbols without a cyclic prefix;

wherein the set time length is n×Ts+Tcp, wherein n×Ts is the length of the uplink pilot time slot, Tcp is the length of the cyclic prefix, and Ts=1/30.72 us, and wherein the length of the cyclic prefix is Tcp=m×Ts−Tpre+ Tds, wherein m×Ts is the length of the symbol with the cyclic prefix in the uplink pilot time slot occupied by the random access channel, Tds is the length of the largest delay extension on a multi-path channel transmitted in order under the cyclic prefix and the preamble application environment in the uplink pilot time slot, its unit is us, Tpre=4096×Ts, and Ts=1/30.72 us.

2. The method according to claim 1, wherein, the length of said one symbol without the cyclic prefix is a half of the length of the preamble Tpre, i.e. Tpre/2, wherein Tpre=4096×Ts, and wherein Ts=1/30.72 us.

3. The method according to claim 1, wherein, the length of the cyclic prefix is Tcp=(m×Ts−Tpre)/2+Tds/ 2, wherein m×Ts is the length of the symbol with the cyclic prefix in the uplink pilot time slot occupied by the random access channel, Tds is the length of the largest delay extension on a multi-path channel transmitted in order under the cyclic prefix and the preamble application environment in the uplink pilot time slot, its unit is us, Tpre=4096×Ts, and Ts=1/30.72 us.

4. The method according to claim 1, wherein, the random access channel is transmitted in one of the following manners:

the length of the uplink pilot time slot is equal to 4400×Ts, Tcp=304×Ts, and the set time length is 4704×Ts; or the length of the uplink pilot time slot is equal to 4384×Ts, Tcp=288×Ts, and the set time length is 4672×Ts; or the length of the uplink pilot time slot is equal to 4416×Ts, Tcp=320×Ts, and the set time length is 4736×Ts; or the length of the uplink pilot time slot is equal to 4400×Ts, Tcp=464×Ts, and the set time length is 4864×Ts; or the length of the uplink pilot time slot is equal to 4384×Ts, Tcp=448×Ts, and the set time length is 4832×Ts; or the length of the uplink pilot time slot is equal to 4416×Ts, Tcp=480×Ts, and the set time length is 4896×Ts; or the length of the uplink pilot time slot is equal to 4400×Ts, Tcp=448×Ts, and the set time length is 4848×Ts; or the length of the uplink pilot time slot is equal to 4384×Ts, Tcp=432×Ts, and the set time length is 4816×Ts; or the length of the uplink pilot time slot is equal to 4416×Ts, Tcp=464×Ts, and the set time length is 4880×Ts.

5. The method according to claim 1, wherein, the wireless communication system is long term evolution system with time division duplex mode, and the symbols are orthogonal frequency division multiple symbols.

6. The method according to claim 2, wherein, the wireless communication system is long term evolution system with time division duplex mode, and the symbols are orthogonal frequency division multiple symbols.

7. The method according to claim 4, wherein, the wireless communication system is long term evolution system with time division duplex mode, and the symbols are orthogonal frequency division multiple symbols.

* * * * *